Sept. 23, 1958
H. J. DIBBLEE
2,853,117
METHOD AND APPARATUS FOR PRODUCING
PANELS AND MARKINGS THEREON
Filed June 27, 1951
2 Sheets-Sheet 1
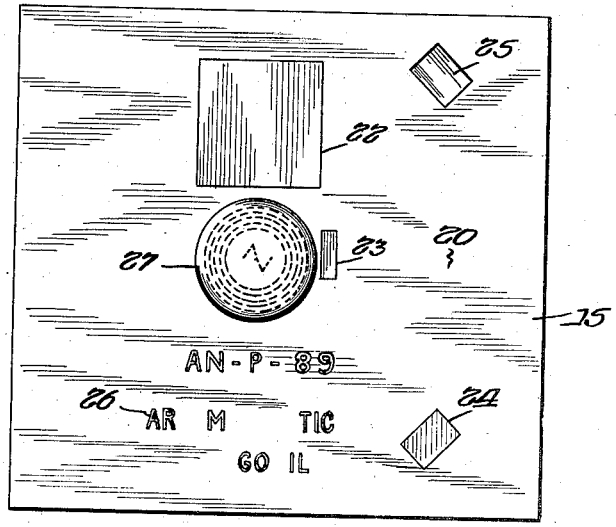
Fig. 1.
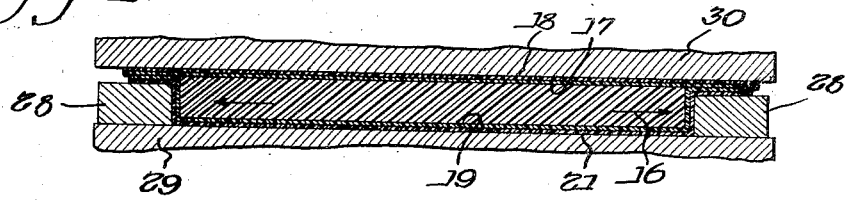
Fig. 2.
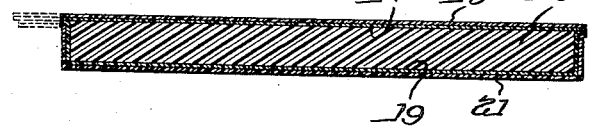
Fig. 3.
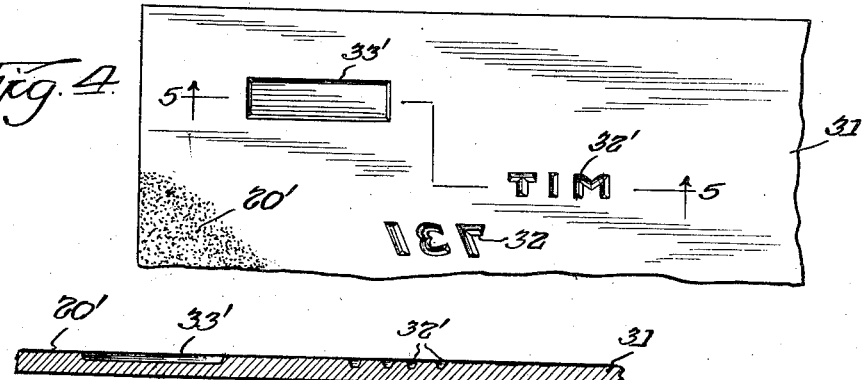
Fig. 4.
Fig. 5.
Inventor.
Harold J. Dibblee.

Sept. 23, 1958  H. J. DIBBLEE  2,853,117
METHOD AND APPARATUS FOR PRODUCING
PANELS AND MARKINGS THEREON
Filed June 27, 1951  2 Sheets-Sheet 2
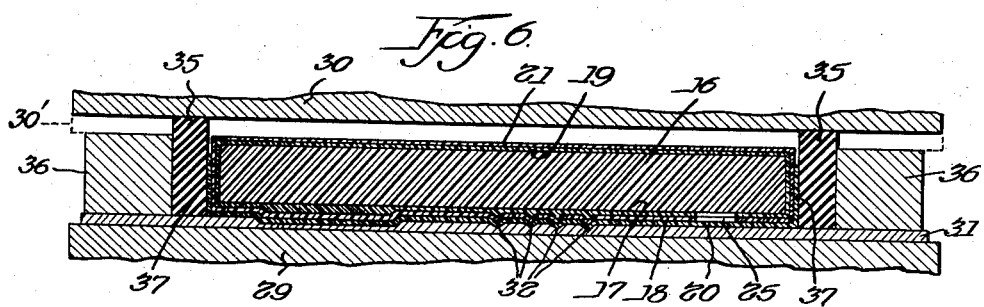
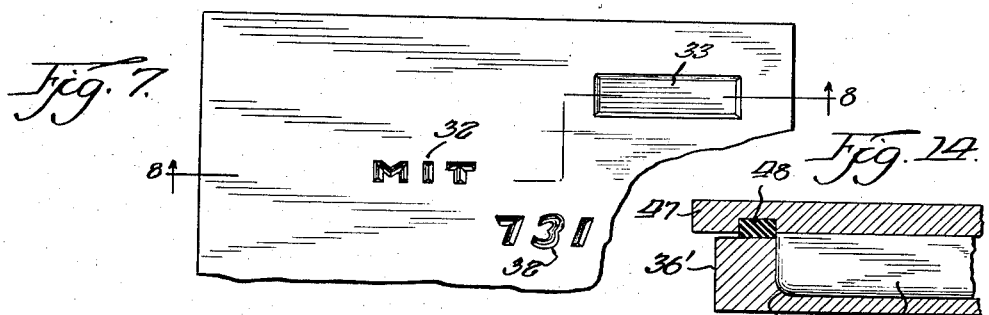
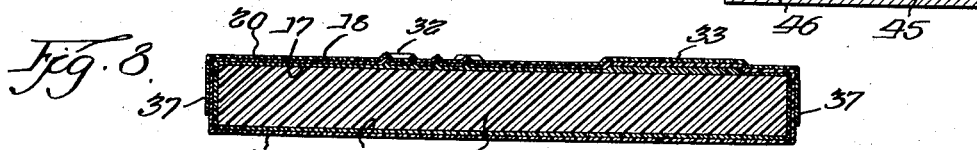
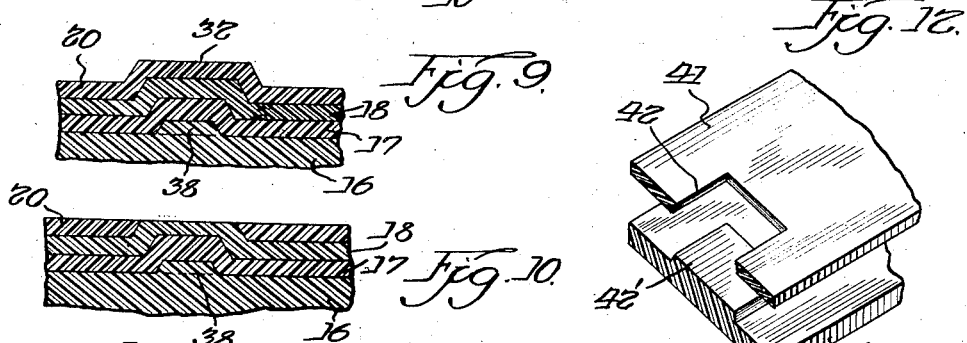
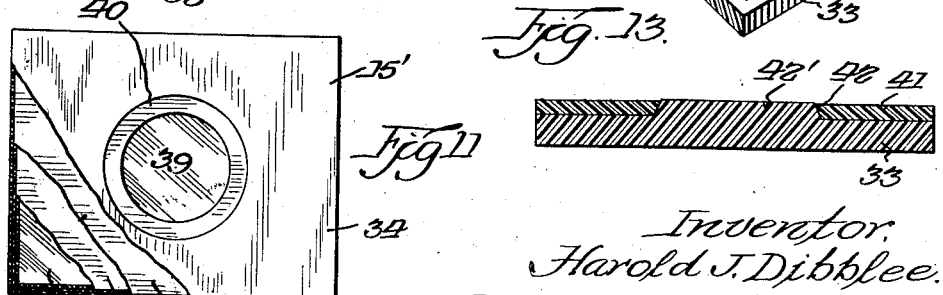
Inventor,
Harold J. Dibblee.

United States Patent Office 2,853,117
Patented Sept. 23, 1958

2,853,117

METHOD AND APPARATUS FOR PRODUCING PANELS AND MARKINGS THEREON

Harold J. Dibblee, Chicago, Ill., assignor, by mesne assignments, to Spartan Coach & Manufacturing Company, Sturgis, Mich., a corporation of Michigan Application June 27, 1951, Serial No. 233,750

8 Claims. (Cl. 154—1)

This invention relates to improvements in instrument panels, and particularly for aircraft instrument panels. The invention particularly relates to a novel method and resultant article required to meet specifications which are unattainable with other forms of panels, and more particularly to meet the specifications set forth in the U. S. Air Force and Navy Aeronautical specification AN–P–89 of November 11, 1948, Air Force-Navy Aeronautical Specification Plate; Plastic Lighting for Cockpit and Interior Controls, and Amendment–1 of August 16, 1950, and later amendments thereto.

It is therefore the principal object of the present invention to provide a panel wherein characters thereon are sharply defined and are without glare.

Another object of the present invention is to provide a laminated panel in accordance with the above specifications built up of transparent and/or translucent and opaque laminations producing a sharp contrast between the opaque and transparent surfaces.

Still another object of the invention is to provide a panel in accordance with the above specification which provides a supplementary source of light to illuminate dials or other devices superimposed on the panel.

A further object of the invention is to provide an improved method of producing markings on vinyl-coated clear plastics to meet the requirements of the above Army-Navy specification in which the markings are to be white translucent on a black background, and when the panel is lighted from within, the markings are to appear as lighted, while the background must not leak light at any point on the face, sides, or edges thereof.

A still further object of the invention is to provide a laminated panel which has high resistance to abrasion.

Many other objects and advantages of the construction herein shown and described will be obvious to those skilled in the art from the disclosure herein given.

To this end my invention consists in the novel construction, arrangement, and combination of parts herein shown and described, and more particularly pointed out in the claims.

In the drawings, wherein like reference characters represent like or corresponding parts:

Fig. 1 is a front elevation of a panel formed in accordance with the method of this invention;

Fig. 2 illustrates a step in the lamination of portions of the translucent and opaque laminations to the inner light-transmitting material;

Fig. 3 illustrates the fabricated panel removed from the die of Fig. 2 after the removal of the edges of the laminations;

Fig. 4 is a plan view of the engraved plate provided with a suitable finish to reduce the glare of the finished, paneled surface, and also illustrates the lettering in reverse for the engraving;

Fig. 5 is a vertical, sectional view taken along line 5—5 of Fig. 4, illustrating the relative depth of the engraving;

Fig. 6 is a view in cross section, of the completed panel within the chase which has a rubber chase for finishing the edges of the panel, and illustrates the engraving thereon in section;

Fig. 7 is a plan view of the finished plate illustrating the engraving thereon prior to its removal to complete the translucent indicia;

Fig. 8 is a vertical, sectional view through the insignia embossed on the plate prior to its removal to complete the indicia;

Fig. 9 is an enlarged view, in cross section, through the indicia illustrating the embossing of the laminations prior to the operation to complete the indicia;

Fig. 10 is a view similar to Fig. 9, in cross section, illustrating the portion of the embossed indicia cut away to provide the translucent indicia within an opaque background;

Fig. 11 illustrates another form of indicia having a center transparent opening surrounded by an annular translucent ring for illumination;

Fig. 12 illustrates another method of forming a translucent indicia within an opaque member;

Fig. 13 illustrates the indicia formed in accordance with Fig. 12 prior to the removal of the portion of the translucent material to complete the indicia; and Fig. 14 illustrates a modified form of chase from that of Fig. 6 for completing a panel in which the edges are rounded.

The preferred embodiment of the invention comprises, in accordance with the above U. S. Air Force-Navy Aeronautical specification, a transparent, light transmitting material for the core in the form of a thermo-plastic material of the class of acrylic resins or materials, and their polymers or co-polymers, methyl methacrylate material being the preferred, laminated between thin layers of white, translucent material, such as white vinyl thermoplastic sheet material, to which are laminated about the face and edges a black vinyl sheet material upon which is then embossed suitable indicia, which afterwards is either sanded off or shaved off to provide a translucent indicia extending through the opaque covering and bonded thereto so that the resultant face of the panel is perfectly level, and in which the opaque background is provided with a surface which is free from glare in accordance with the above specifications.

The resultant panel may be suitably fabricated to the proper size and shape, depending upon the size of the panel required, and any holes for the erection of the panel, or other machine work thereon, may be done as required. The panel is so formed in the dies as to completely enclose the panel in an opaque covering which has on the exposed face suitable indicia, either lettering or geometric figures, or the like, which are translucent, and in which the edges of the indicia are clearly defined, but are integral with the surrounding opaque background and extend completely therethrough. Illumination for the panel may be provided with suitable panel lights which may be inserted through holes drilled in the panel material wherever necessary. The transparent layer within the center of the panel transmits the light in all directions, and the translucent indicia permits the light to illuminate the indicia, and the translucent layers also provide reflective faces for the transparent layer to transmit the light throughout the transparent panel in all directions. The exposed edges of the panel are completely covered with the opaque outer laminations so that there is no light leakage at any point on the face, sides, or edges of the panels except through the translucent indicia.

Referring more particularly to the drawings, a panel 15 represents a laminated panel formed according to my invention. A center layer 16 is preferably thicker than the other laminations 17, 18, 19, which are translucent and provide a reflective surface for the transparent center layer 16. The completed panel is provided with outer, opaque layers 20 and 21. It is preferred to form the center layer of a light-transmitting material of a suitable thermo-plastic material particularly of the class of acrylic resins or materials, and their polymers and co-polymers, methyl methacrylate, being preferable, although other suitable light-transmitting material may be employed. The translucent layers are preferably formed from thin sheets of a thermo-plastic resin, such as white vinyl sheets, and the opaque outer covering is preferably formed from thin sheets of a thermo-plastic resin, such as black vinyl sheets. It is also possible to form the translucent sheets from cellulosic material, such as cellulose acetate. The preferred material, however, for the translucent and opaque laminations is of the class of poly-vinyl or vinyl resins and their polymers or co-polymers.

The completed panel may be formed, as illustrated in Fig. 1, with a geometric-shaped opening 22 in the form of a square or rectangular-shaped openings 23 and 24. It is also possible to provide a clear opening 25 wherever necessary, and the indicia, as indicated at 26, is also translucent, and the edges are clearly defined upon the opaque background. It is possible to provide a suitable indicia wherever necessary. A suitable source of illumination 27 may be provided by a suitable light source in a suitable mounting, and may take any number of commercial forms available which may be suitably mounted within a transparent plate to transmit the light emitted from the light source to the areas which are to be illuminated.

Referring to Figs. 2 through 10, the preferred method for fabricating the panel will be described. The transparent center layer 16, together with a translucent layer 19 and an opaque layer 21, is placed upon a chase 28 mounted upon the lower platen 29 of a press. It is preferred to make the chase 28 substantially 3/16" thick, depending upon the thickness of the final panel, and with an opening about 1/64 of an inch smaller all around than the desired panel face. Transparent thermo-plastic material of a heat resistant type which is used for layer 16 is then fabricated so it is about 1/16 of an inch smaller all around than the opening in the chase. The thickness of the transparent layer 16 shall be substantially the same thickness as the metal chase or the complete panel. The chase 28 is placed on the bottom platen of the laminating press. Then in the following order, there is first placed over the opening in the chase a sheet 21 of black vinyl thermo-plastic material substantially 0.004 inch thick, and a sheet 19 of white vinyl thermo-plastic material 19 substantially 0.008". Next is placed the transparent thermo-plastic blank 16, upon which is placed two sheets 17 and 18 of white vinyl thermo-plastic material, each substantially 0.004 inch in thickness. A single thickness of 0.008 inch may be used instead of the two layers 0.004 inch in thickness.

The press is then closed by lowering an upper platen 30, and the platens 29 and 30, which are suitably heated, cause the laminations of the translucent vinyl sheets and the black vinyl sheets to be laminated to the transparent layer 16 of transparent thermo-plastic material. It is preferred to laminate at substantially 220° F., and under a pressure of 100 pounds per square inch. Fig. 2 illustrates the lamination of the plastic sheets to the transparent layer with the press closed, and with the ends of the laminations overlying the chase. This step, when completed, has the white translucent layers extending across the upper face of the center transparent layer, and the opaque layer and the bottom layer of translucent material firmly affixed and laminated to the edges of the center layer. This is brought about by the flow of the plastic material forming the transparent center layer so that, as the press is closed under the action of the heat and pressure, the center layer moves outwardly laterally, as indicated by the arrows, Fig. 2, closing the space between the original width of the center layer and the inner peripheral space formed by the chase. Referring to Fig. 3, there is illustrated the blank formed from the operation described with reference to Fig. 2 after the edges of the laminations have been trimmed off. If any markings or indicia are to be shown clear in the face of the panel, for example, the indicia 25, the white vinyl translucent layers 17 and 18 are cut away in this area.

Referring to Figs. 4 and 5, an engraved plate 31 is shown which forms embossed indicia 32, as shown in Figs. 6, 7, and 8. The engraved plate is so formed that the indicia are engraved in reverse, as shown in Fig. 4 at 32', on the metal plate 31. Any geometrical figure or indicia, as 33, which is to be formed on the plate is also engraved in reverse, as shown in 33'. The indicia 33' show the formation of a rectangular indicia, and if it is desired to form the finished indicia 22, 23, and 24, these are engraved in reverse as described with reference to the indicia 33 previously described. In order to obtain suitably formed indicia for the completed panel, the engravings which are made in reverse are engraved to a depth equal to 0.002 inch more than the thickness of the black vinyl outer layer 20. Since the black vinyl layer is substantially 0.004 inch in thickness, the depth of the engraving will therefore be substantially 0.006 inch in depth. The width of the engraving cut, which applies equally to numerals or lettering, as well as to geometric indicia, should be equal to the desired width of the finished indicia, plus an amount equal to twice the thickness of the black vinyl lamination.

Referring to Fig. 6, the next step in the method of forming the laminated panel is illustrated in which the platens are shown after the other layer 20 of opaque material, corresponding to the lamination 21 on the opposite face, has been laminated to the blank, as shown in Fig. 3. In this step, the engraved plate 31 is placed on the bottom platen 29 of the laminating press with a rubber chase 35 conforming to the shape of the platen placed upon the engraving plate. The rubber or synthetic rubber, such as "neoprene" which forms the chase 35 is preferably formed 1/4 inch in thickness as the completed panel is substantially 3/16 inch in thickness for the size of the finished panel. This chase 35 is then confined in a larger, rigid metal chase 36, which is 3/16 inch in thickness.

In this final step of laminating, the engraved plate 31 is placed on the bottom platen 29, as illustrated, with the engraved side up, and with the chases 35 and 36 mounted upon it. The final sheet of opaque material, such as black vinyl, to be laminated to the blank is cut so that it is substantially 1/8 inch larger all around than the blank formed from the previous step as described with reference to Figs. 2 and 3. The blank, as described with reference to Figs. 2 and 3, is placed with the translucent or white vinyl surface down on top of the layer 20. The press is then closed, and the upper platen 30 is brought to the dotted line position 30'. This tends to force the rubber chase 35 laterally inwardly, and as the previous blank is forced downwardly, the extra material of the sheet 20 is formed upwardly to the position 37 tightly against the previously completed blank. Since the lamination takes place at substantially 260° F., and 90 pounds per square inch, the blank is formed to completed size entirely encased in the opaque layer of black vinyl thermoplastic material with the white or translucent laminations 17 and 19 next to the clear plastic center layer 16. Simultaneously with this lamination, the desired indicia or markings are embossed on the face of the panel which is to be the outer face when erected in place. When removed from the press, the panel has the indicia embossed thereon, as illustrated in Fig. 7. Fig. 8 illustrates the relative shape of the various embossed layers forming the indicia 32 and 33 when a section is taken therethrough to show that the layers are entirely laminated through their cross section, and that the inner transparent plastic layer 16 under the action of heat and pressure also flows within the engraved portion of the layer 17, as illustrated at 38 in Figs. 9 and 10.

In order to form the translucent indicia, such as the letters, numerals, and geometric figures illustrated in Fig. 1, the embossed areas, as shown in Figs. 8 and 9, may be preferably removed by sanding on a flat, wet-belt sanding machine. This will cause the markings to appear as white translucent marks on a background formed by the black surface of the black vinyl lamination. Where the white vinyl has been taken out in the layers 17 and 18, as illustrated in Figs. 1 and 6, the indicia 25 will be left clear by this sanding operation. This sanding operation will leave the translucent indicia as illustrated in Fig. 1, with the translucent layer 18 extending through the black opaque layer 34 forming the indicia, and with the translucent layers 17 and 19 laminated in intimate contact with the center transparent layer 16, as well as to the outer opaque layer 20. The sanding operation also leaves a surface which diffuses the light to prevent glare.

If it is desired to form an opaque outer surface which is entirely free from glare, the engraved plate 31 may have its engraved surface before the indicia are engraved thereon sandblasted as indicated at 20' to form a light-diffusing surface. Any other suitable means other than sandblasting may also be used to provide a glare-free surface, as for example, rolling small steel balls on the surface as sand is applied during the operation. Either of the above methods serves to cut a light-diffusing surface which is free of glare to meet any desired specification upon the engraved plate which, under the action of heat and pressure in the laminating operation is then transferred to the outer opaque layer.

In practising the method of my invention, it is preferred that the various metal chases 28 and 36, described above, in the method of laminating a panel, should be of the same thickness as the finished panel or plate. In the particular method described, the metal chases used were 3/16 of an inch thick to meet the thickness requirements of the aforementioned particular Army-Navy specifications.

Likewise, although acrylic resins such as methyl methacrylate has been described with respect to the inner transparent light transmitting blank, any suitable thermoplastic transparent material may be used, and again available commercial forms of methyl methacrylate which is a transparent plastic of the heat-resistant type has been used to particularly comply with the material requirements of the above-identified specification. Although black vinyl thermo-plastic material has been used as the outer opaque layer, and white vinyl plastic material has been used as the translucent layer, it is to be understood that the other colors, or combinations of colors, may be used for the opaque and translucent layers wherever desired.

In the various steps of laminating described above, temperatures and pressures have been specified for the particular plastics used, but these temperatures and pressures need not necessarily be fixed. It is permissible that a range of temperature varying within the range of from substantially 200° F. to 300° F., and pressure varying within the range of from substantially 50 pounds per square inch to 250 pounds per square inch may be used without departing from the scope of my invention, the exact range being determined by the materials being used.

It is also to be understood that the resilient chase described with reference to Fig. 6 should preferably be of synthetic rubber such as "neoprene" or some other suitable resilient material, and formed 1/16 of an inch thicker than the completed panel plate. Furthermore, the resilient material forming this chase 35 should be confined in a larger chase of metal 36, or other suitable rigid material. With the chase formed as illustrated in Fig. 6, the rigid material of the outer chase, and the resilient material of the inner chase insures intimate contact between the top and bottom platen and the chase, hereby eliminating the flashing of the opaque vinyl material around the chase. This flash, which might form from using another form of chase construction, is very undesirable as its removal in any later operation causes light leaks at the edges where the flash is removed, and destroys the effect of a one-piece vinyl coating. If it is unnecessary to eliminate the flash in the completed process, a metal chase may be used instead of the resilient chase 35.

Referring to the engraved plate shown in Figs. 4, 5, and 6, the depth of engraving is also of great importance. This depth must be slightly more than the thickness of the upper layer 20, as best illustrated in Figs. 9 and 10, so that the subsequent sanding or shaving operation will remove all of the upper layer from the embossed area so that the under layer is exposed, as illustrated in the enlarged view of Fig. 10. The depth must not be too deep or both layers 17 and 18 will be removed by sanding or shaving. In addition, the engraving must be sharp to insure clean-cut markings, as illustrated in the final panel shown in Fig. 1.

In the step in which the preliminary blank is formed, as illustrated in Figs. 2 and 3, it is also important that the size of the chase is correct with respect to the completed panel so that, under the heat and pressure of the laminating step, the thermo-plastic transparent center layer flows outwardly laterally causing the black opaque layer to be firmly formed against the edges of the panel. This is extremely desirable so that, in the latter operation, as described with reference to Fig. 6, in adding the black vinyl outer layer, it will overlap the previous opaque layer, and form a complete seal, as shown in cross section in Figs. 6 and 8. Furthermore, the size of the final black vinyl or opaque outer sheet 20 should be of such a size that it is larger than the complete blank by an amount less than the thickness of the finished plate to prevent the necessity of trimming after the final operation. This is shown in Figs. 6 and 8. Although in the drawings, Figs. 6 and 8, the edges 37 of this outer layer appear raised for the purpose of illustrating the operation, the actual completed panel, upon inspection, shows no line of demarcation whatsoever, as the edges of the opaque layer 21 and the edges 37 of the opaque layer 20, under the application of heat and pressure, apparently merge into one.

Although any suitable method of cutting or abrading may be used to remove the embossing as formed in Figs. 6, 8, and 9, such as by sanding or shaving as described, it is also possible to use other suitable methods, such as grinding, routing, shaping, planing or lapping to remove this embossed portion to complete the indicia on the face of the panel so that clearly formed indicia may be had with the inner transparent layer extending through the outer opaque layer in clearly defined lines, but yet integrally bonded thereto along these edges.

Referring to Fig. 11, there is illustrated a panel construction 15' having an opaque surface 34, a transparent circular opening 39, formed by the inner transparent layer 16, over which is arranged translucent layers 17 and 18, the latter formed in accordance with the method described above to form an annular translucent indicia 40. It is to be understood that other various geometric arrangements of the indicia may be formed in accordance with the above disclosure without departing from the scope of this invention.

Referring to Figs. 12 and 13, there is illustrated a modified form of my invention in which the various indicia described with regard to Figs. 1 through 10 may be formed. In this embodiment, it is necessary to first blank an outer opaque layer 41 having the necessary indicia 42 formed therein, which is then assembled by registering with an inner translucent layer 33 having embossed thereon indicia 42' complemental to the perforated indicia in the outer layer 41. The thickness of the embossed portion 42' is slightly thicker than the thickness of the opaque layer 41 so that under heat and pressure in the final operation of applying the opaque layer to the blank, as formed in the manner previously described with reference to Fig. 2, it will flow so that the embossed portion 42' and the peripheral edges of the perforations 42 weld together under the action of heat and pressure along the edges. The resultant blank, after suitably shaving the excess amount of the embossed material from the portions of the indicia extending through the opaque layer, will appear the same as the indicia described with reference to Fig. 10. The opaque layer thus appears to have translucent indicia integrally formed from the opaque layer and extending therethrough. It is also possible to form the embossed portion 42' in any other suitable manner to raise the embossed portions above the thickness of the original material of the lamination from which it is formed, and under the action of heat and pressure in the final operation, the flow of the thermo-plastic layers will tend to fill any openings so that there is a complete bond between each lamination where it is affixed to the center layer, as illustrated, for example, in Figs. 9 and 10.

Referring to Fig. 14, there is illustrated a modified form of die construction from that of Fig. 6 in which a completed panel 45 may be formed with rounded edges 46 rather than the square edges shown in the completed panel formed by the die of Fig. 6. In this method, the chase 36' is formed of metal to the final size of the completed panel, and having the rounded edges formed in the bottom of the chase, as shown. If it is necessary to form indicia on the surface of the panel as described above, the necessary engraving is formed in the bottom of the panel, as well as a suitable finish to be formed on the face of the panel as described above, such as by sandblasting, to provide a surface which diffuses the light so that there is no glare on the opaque surface. The upper chase 47 is formed with a rubber or resilient insert chase 48 which functions in the same manner as the chase 35 described with reference to Fig. 6 to cause the layers of material forming the outer face to be firmly laminated to the edges of the completed panel.

From the above methods of forming a panel, it is believed that there has been disclosed simple methods of embossing laminated material, and the subsequent step of removing, shaving or cutting away of the embossed section to expose the under layer so that various forms and shapes of indicia may be suitably formed which comprise a translucent indicia upon an opaque background in which the translucent layer extends through the opaque layer, and is firmly bonded about the edges of the indicia with the opaque layer. In addition, the outer face of the indicia and the face of the opaque layer lie in the same plane so that the resultant surface of the panel appears to have the translucent indicia formed from the opaque layer, there being no line of demarcation between the two materials forming the translucent indicia and the outer opaque layer other than the final shape of the indicia.

It is also evident that there has been disclosed a simple method of laminating and embossing a panel construction in which the indicia are integrally formed in one operation.

There has also been disclosed a novel method of laminating a panel construction in which the laminations forming the edges and sides of the panel are formed by using a simple chase, and using the pressure on the sides and edges caused by the flow of the inner thermoplastic material, forming the light-transmitting layer as the source of the laminating pressure on the sides and edges. There has also been disclosed a simple method and shaping die or fixture in which the chase is formed of resilient material so that the final outer layer may be applied along the edges of the panel to prevent flash and unnecessary trimming in order that the panel is completed in a minimum number of steps.

Furthermore, a panel structure formed as disclosed above, will pass the various service tests such as, resistance to abrasion, humidity, high and low temperature, vibration, altitude and peeling, and others necessary to meet the requirements of the aforementioned specification.

Having thus described my invention, it is obvious that various immaterial modifications may be made in the same without departing from the spirit of my invention; hence, I do not wish to be understood as limiting myself to the exact form, construction, arrangement, and combination of parts herein shown and described, or uses mentioned.

What I claim as new and desire to secure by Letters Patent is:

1. The method of forming a panel formed with indicia including one or more transparent openings and/or one or more translucent openings comprising a layer of transparent light transmitting material, a translucent layer and a reflective layer and an opaque covering completely surrounding the outer peripheral surface of the panel, which comprises the following steps: assembling a transparent plastic light transmitting acrylic material and a layer of transparent thermo-plastic vinyl material and a layer of opaque thermo-plastic vinyl material on a chase of a laminating press, the dimensions of the chase being slightly larger than those of the resultant panel, the area of the aforesaid layers being substantially larger than the planar surface of the resultant panel, placing one or more layers of translucent thermo-plastic vinyl material upon the top of the transparent material, said area of the last-mentioned one or more layers of the material being slightly larger than that of the resultant panel, and laminating at a predetermined temperature of substantially 220° F. and a predetermined pressure of substantially 100 lbs. per square inch, causing a semi-fabricated panel blank translucent on one face and opaque on the opposite face with a light reflecting surface contiguous to each face of the light transmitting transparent material, and substantially opaque on all edges of the resultant preformed panel blank, then placing the preformed panel blank within an opening on another chase overlying an engraved plate having an engraved surface in reverse to the final indicia to be formed on the panel, said chase having resilient means about the peripheral edge of said opening, placing a sheet of opaque thermo-plastic vinyl material over the panel blank, and laminating at a predetermined temperature of substantially 260° F. and a predetermined pressure of substantially 90 lbs. per square inch, causing a panel blank to be formed in finished size completely encased in an opaque surface covering with translucent face surfaces contiguous to the transparent light transmitting material forming a reflective surface and with the desired indicia embossed on a face of the completed panel blank as embossed areas, and removing the embossed areas forming indicia.

2. In the method as set forth in claim 1, wherein the predetermined temperatures are within the range of from substantially 200° F. to 300° F. and the predetermined pressures are within the range of from substantially 50 to 250 pounds per square inch.

3. In the method as set forth in claim 1, in which the first lamination is performed at a temperature of substantially 200° F. and a pressure of substantially 100 pounds per square inch and the last lamination is performed at a temperature of substantially 260° F. and a pressure of substantially 90 pounds per square inch.

4. In the method as set forth in claim 1, characterized by the chase for this step including a larger rigid chase substantially the thickness of the completed panel in which is confined a rubber chase formed to the surface of the completed panel, said thickness of the rubber chase being greater than that of the rigid chase so that when the pressure is applied, the outer layer to be laminated is conformed to the peripheral edges of the blank completing the panel.

5. The method of forming a panel formed with indicia including one or more transparent openings and/or one or more translucent openings comprising a layer of transparent light transmitting material, a translucent layer and a reflective layer and an opaque covering completely surrounding the outer peripheral surface of the panel, which comprises the following steps: assembling a transparent plastic light transmitting acrylic material and a layer of transparent thermo-plastic vinyl material and a layer of opaque thermo-plastic vinyl material on a chase of a laminating press, the dimensions of which are slightly larger than those of the resultant panel, placing one or more layers of translucent thermo-plastic vinyl material upon the top of the transparent material, said area of the one or more layers of the material being substantially larger than that of the resultant panel, and laminating at a predetermined temperature of substantially 200° F. and a predetermined pressure of substantially 100 lbs. per square inch, causing a semi-fabricated panel blank translucent on one face and opaque on the opposite face with a light reflecting surface contiguous to each face of the light transmitting transparent material, and substantially opaque on all edges of the resultant blank, cutting away the translucent material for any of the indicia which are transparent, fabricating the semi-fabricated panel blank into a panel with embossed areas providing indicia, removing the embossed areas forming the indicia causing the resultant indicia to appear as translucent marks on the opaque surface, and in which the indicia will be clear where the translucent material forming an indicia was previously cut away.

6. The method of forming a panel formed with indicia including one or more transparent openings and/or one or more translucent openings comprising a layer of transparent light transmitting material, a translucent layer and a reflective layer and an opaque covering completely surrounding the outer peripheral surface of the panel, which comprises the following steps: assembling a transparent plastic light transmitting acrylic material and a layer of translucent thermo-plastic vinyl material and a layer of opaque thermo-plastic vinyl material on a chase of a laminating press, the dimensions of which are slightly larger than those of the resultant panel, placing one or more layers of translucent thermo-plastic vinyl material upon the top of the transparent acrylic material, said area of one or more layers of the material being substantially larger than that of the resultant panel, and laminating at a predetermined temperature of substantially 220° F. and a predetermined pressure of substantially 100 lbs. per square inch, causing a semi-fabricated panel blank translucent on one face and opaque on the opposite face with a light reflecting surface contiguous to each face of the light transmitting transparent material, and substantially opaque on all edges of the resultant blank, then placing the preformed panel blank within an opening of another chase overlying an engraved plate having an engraved surface in reverse to the final indicia to be formed on the panel, said chase having resilient means about the peripheral edge of said opening, placing a sheet of opaque thermo-plastic vinyl material over the panel blank, and laminating at a predetermined temperature of substantially 260° F. and a predetermined pressure of substantially 90 lbs. per square inch, causing a panel blank to be formed in finished size completely encased in an opaque surface covering with translucent face surfaces contiguous to the transparent light transmitting material forming a reflective surface and with the desired indicia embossed on a face of the completed panel blank, and removing the embossed areas forming the indicia causing the resultant indicia to appear as translucent marks on the opaque surface.

7. The combination with a laminating press having heated platens, of a rigid chase having an opening, a resilient chase mounted within the opening of the rigid chase, said opening of the resilient chase substantially the same peripheral size as the blank to which a thin layer of material is to be laminated, superimposing the blank to be laminated upon the thin layer of material on the top of the resilient chase, said thickness of said resilient chase somewhat thicker than the rigid chase, whereby upon closure of the press under heat and pressure, the blank and layer of material are laminated together on the face and peripheral edges of the blank.

8. The combination with a laminating press having heated platens, of a rigid chase having an opening, a resilient chase mounted within the opening of the rigid chase, said opening of the resilient chase substantially the same peripheral size as the blank to which a thin layer of material is to be laminated, superimposing the blank to be laminated upon the thin layer of material on the top of the resilient chase, said thickness of said resilient chase somewhat thicker than the rigid chase whereby upon closure of the press under heat and pressure, the blank and layer of material are laminated together on the face and peripheral edges of the blank, and an engraved plate contiguous to which said rigid and resilient chases are positioned whereby upon closure of the press under heat and pressure, an embossed surface is formed upon the laminated surface of said blank.

References Cited in the file of this patent

UNITED STATES PATENTS

| | | |
|---|---|---|
| 2,128,246 | Hardesty | Aug. 30, 1948 |
| 2,518,726 | Shlenker | Aug. 15, 1950 |
| 2,602,036 | Sullivan | July 1, 1952 |